United States Patent
Zhang et al.

(10) Patent No.: US 12,293,397 B2
(45) Date of Patent: May 6, 2025

(54) ENERGY MANAGEMENT SYSTEM

(71) Applicant: Honda Motor Co., Ltd., Tokyo (JP)

(72) Inventors: Junlei Zhang, Long Beach, CA (US); Robert M. Uyeki, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 246 days.

(21) Appl. No.: 18/057,372

(22) Filed: Nov. 21, 2022

(65) Prior Publication Data

US 2024/0169409 A1 May 23, 2024

(51) Int. Cl.
*G06Q 30/00* (2023.01)
*G06Q 30/0601* (2023.01)
*G06Q 50/06* (2012.01)

(52) U.S. Cl.
CPC ......... *G06Q 30/0629* (2013.01); *G06Q 50/06* (2013.01)

(58) Field of Classification Search
CPC .............................................. G06Q 30/06–08
See application file for complete search history.

(56) References Cited

U.S. PATENT DOCUMENTS

| | | | |
|---|---|---|---|
| 8,872,379 B2 | 10/2014 | Ruiz et al. | |
| 9,244,445 B2 | 1/2016 | Finch et al. | |
| 9,246,332 B2 | 1/2016 | Broniak et al. | |
| 10,705,496 B2 | 7/2020 | Son et al. | |
| 2002/0178047 A1* | 11/2002 | Or | G06Q 10/04 |
| | | | 705/412 |
| 2012/0065791 A1* | 3/2012 | Besore | G06Q 30/02 |
| | | | 700/291 |
| 2014/0180968 A1 | 6/2014 | Song et al. | |
| 2016/0209822 A1* | 7/2016 | Pulliam | G06Q 30/0631 |
| 2024/0171001 A1* | 5/2024 | Zhang | H02J 13/00002 |

FOREIGN PATENT DOCUMENTS

| | | |
|---|---|---|
| CN | 102306954 B2 | 7/2013 |
| JP | 6397338 B2 | 9/2018 |
| JP | 6438761 B2 | 12/2018 |
| JP | 6478240 B2 | 3/2019 |

OTHER PUBLICATIONS

"Compressed Air System Helps Save "Dough" in Energy Usage", Food Engineering 81.10:80, BNP Media, Oct. 2009 (Year: 2009).*

* cited by examiner

*Primary Examiner* — Ethan D Civan
(74) *Attorney, Agent, or Firm* — Plumsea Law Group, LLC

(57) ABSTRACT

A method of operating an energy management system includes: obtaining first energy usage data of a first device; storing the first energy usage data in a database of the energy management system; storing a user preference in the database; recording a measured energy usage data of the first device; determining a difference between the first energy usage data to the measured energy usage data; determining that the difference exceeds a threshold specified in the user preference; retrieving second energy usage data of a second device; and displaying a recommendation including the second device.

15 Claims, 13 Drawing Sheets

FIG. 7

| DATE | TIME | EV SOC | LOCATION | CHARGE LEVEL | DEPARTURE TIME | PLUGGED IN/V2G CAPABLE | TARGET SOC | MIN SOC |
|---|---|---|---|---|---|---|---|---|
| AUG 4 | 4:32 PM | 75% | LAT/ION* | L2 | 7 AM | YES / YES | 100% | 50% |

FIG. 8

| DEVICE | ENERGY CONSUMPTION | BASE DUTY CYCLE | MIN DUTY CYCLE | DURATION | PRIORITIZATION | CONFIRMATION |
|---|---|---|---|---|---|---|
| MEDICAL | XXX KWH | ALWAYS ON | ALWAYS ON | ALWAYS ON | 1 | OK |
| REFRIGERATION | XXX KWH | 30 ON 70 OFF | 20 ON 80 OFF | 5 DAYS | 2 | OK |
|  |  |  | 10 ON 90 OFF | 2 DAYS | 3 | OK |
|  |  |  | 5 ON 95 OFF | 1 DAY | 4 | OK |
|  |  |  | 100 OFF | 10 HRS | 5 | OK |
| HVAC | XXX KWH | 30 ON 70 OFF |  | XXX HRS | 3 | OK |
| POOL PUMP | XXX KWH |  |  |  | 10 | OK |
| OTHER |  |  |  |  |  |  |

ENERGY MANAGEMENT SYSTEM

BACKGROUND

1. Field of the Disclosure

The present disclosure relates to energy management, and more particularly to a home energy management system with energy usage decision making functions.

2. Description of Related Art

Electrical generation and distribution systems are becoming less dependable. Reliability has been effected by increasing demand, diversification of electrical generation sources, and lack of investment in infrastructure. The reliability problem is likely to continue until the generation and distribution systems can be stabilized.

The Honda Home Energy Management System (HEMS) is a hardware and software system that monitors, controls and optimizes electrical generation and consumption throughout a home's microgrid. The HEMS includes an energy storage system using battery cells. The HEMS may store solar energy generated during the day for use at night, when household demand typically peaks and electric vehicles are usually charged. The HEMS is also capable of drawing power from a power grid at carbon-efficient times.

There is a need for a home energy management system with improved energy usage decision making in unreliable power grid environments.

SUMMARY OF THE INVENTION

The present disclosure is directed to improvements in energy usage enabled by methods, systems and devices that make educated, logical selections regarding energy usage based on actual usage patterns of energy consuming devices. Some embodiments include improved data acquisition capabilities, improved data visualization and analytic applications improving device application and usage, for example, to control energy loads within a home.

In one aspect, a method of operating an energy management system comprising: obtaining first energy usage data of a first device; storing the first energy usage data in a database of the energy management system; storing a user preference in the database; recording a measured energy usage data of the first device; determining a difference between the first energy usage data to the measured energy usage data; determining that the difference exceeds a threshold specified in the user preference; retrieving second energy usage data of a second device; and displaying a recommendation including the second device.

In one or more aspects, a method of operating an energy management system comprising: obtaining first energy usage data of a first device; storing the first energy usage data in a database of the energy management system; storing a user preference in the database; recording a measured energy usage data of the first device; determining a difference between the first energy usage data to the measured energy usage data; determining that the difference exceeds a threshold specified in the user preference; determining a recommended response upon determining that the difference exceeds a threshold specified in the user preference; and displaying the recommended response.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 7 illustrates example device data and user preferences for an electric vehicle according to an embodiment;

FIG. 8 illustrates an embodiment of device data and user preferences associated with a home;

DETAILED DESCRIPTION

There is a need in the art for a system and method that provides home energy management with energy usage decision making functions. According to some aspects, a home energy management system obtains energy usage or energy guide information (herein after referred to as energy usage data) about an energy consuming device and stores that information in an internal home energy management system database. The energy usage data gives expected energy usage of device. The energy usage data may be accessible to the home energy management system during a power outage with no network connectivity. The home energy management system may use the energy usage data to make decisions that prioritize devices in a power limited environment, such as during a brown-out or black-out, or to protect devices from power fluctuations during a start up period. The home energy management system may generate and store the energy usage data, user preferences, and usage data of the devices in the database. In some cases, the home energy management system may use the energy usage data, user preferences, and usage data of the devices to generate recommendations about which devices to power using a backup power system during a power outage, or which devices to power during a brownout or a drop in voltage in an electrical power supply system. In yet another example, the home energy management system may graphically display recommendations based on a comparison of how a device's current or historical power usage and age compares to its energy usage data and average device lifespan to determine and display possible value or cost savings in replacing the device with a new, more energy efficient, device.

Figure 1:
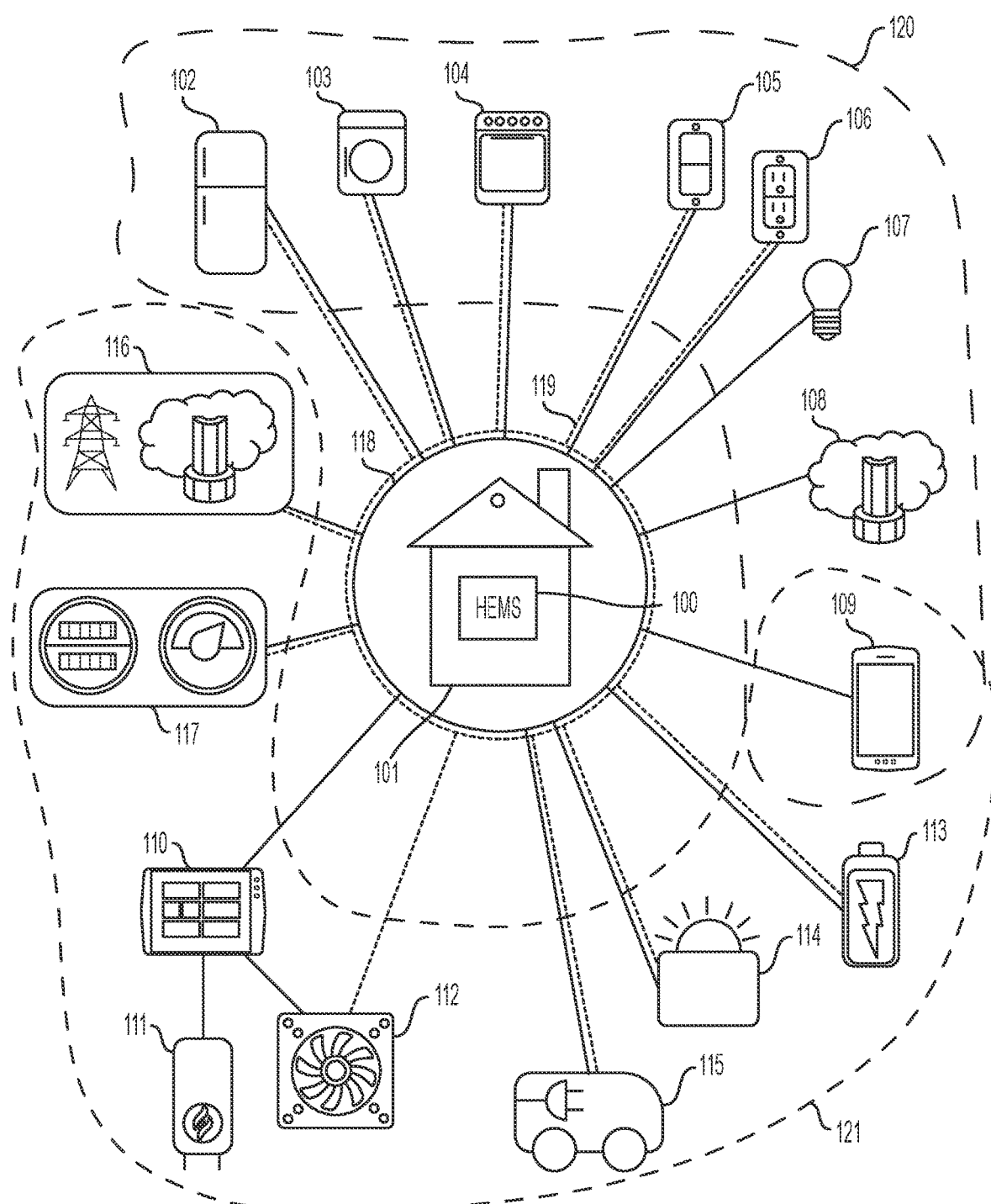
FIG. 1 illustrates an embodiment of a network including a home energy management system.

Referring to FIG. 1, a home energy management system 100 in a home 101 or other premises communicates information with a variety of devices in the home 101 via a communication network 118 and/or an electrical circuit 119. These devices may include a refrigerator/freezer 102, a washing machine 103, an oven 104, switches 105, outlets 106 and lighting 107, one or more of which may be a smart device. The home energy management system 100 may be in communication with a backend server 108 and a computer system 109 having a graphical user interface (GUI). The home energy management system 100 may further be in communication with additional devices including a home environment control computer 110, a tankless water heater 111, a whole house air handler 112, a battery backup system 113 (e.g., an Uninterruptible Power Supply (UPS)), an energy generator 114, such as a solar panel, wind turbine or gas powered generator, and an electric vehicle 115. In some cases, some devices may be connected to the home energy management system 100 through other devices in the home. For example, the home environment control computer 110 may connect to the tankless water heater 111 and the whole house air handler 112. Devices described herein are examples. Other devices may be installed in a home, such as an air conditioning system, clothes drier and pool equipment. Still other devices may include connected smart devices, such as a coffee machine, lights, garage door openers, and ceiling fans.

In some embodiments, the home energy management system 100 may communicate with a utility system such as a utility company server 116 and a utility meter 117. The utility meter 117 may be installed inside the home 101, for example, to measure overall energy usage, current energy usage, and consumption of energy by a device or group of devices. In some embodiments, the utility meter 117 may be installed outside of the home 101, for example, installed on a side of the home 101 or remote from the home 101, for example, at a utility provider. Example meters include a data bandwidth meter, a water meter or another utility's meter associated with a customer.

According to some embodiments, the connected devices can be grouped by a device manager of the home energy management system 100 into logical groups such as a smart home system 120 and a home energy system 121. For example, the case of the home energy system 121, the home energy management system 100 may function as a site controller for the home 101.

As illustrated, the communication network 118 and the electrical circuit 119 may have different topologies. For example, while some device may be connected to both the communication network 118 and the electrical circuit 119, other devices may be connected to the communication network 118 or the electrical circuit 119.

Figure 2:
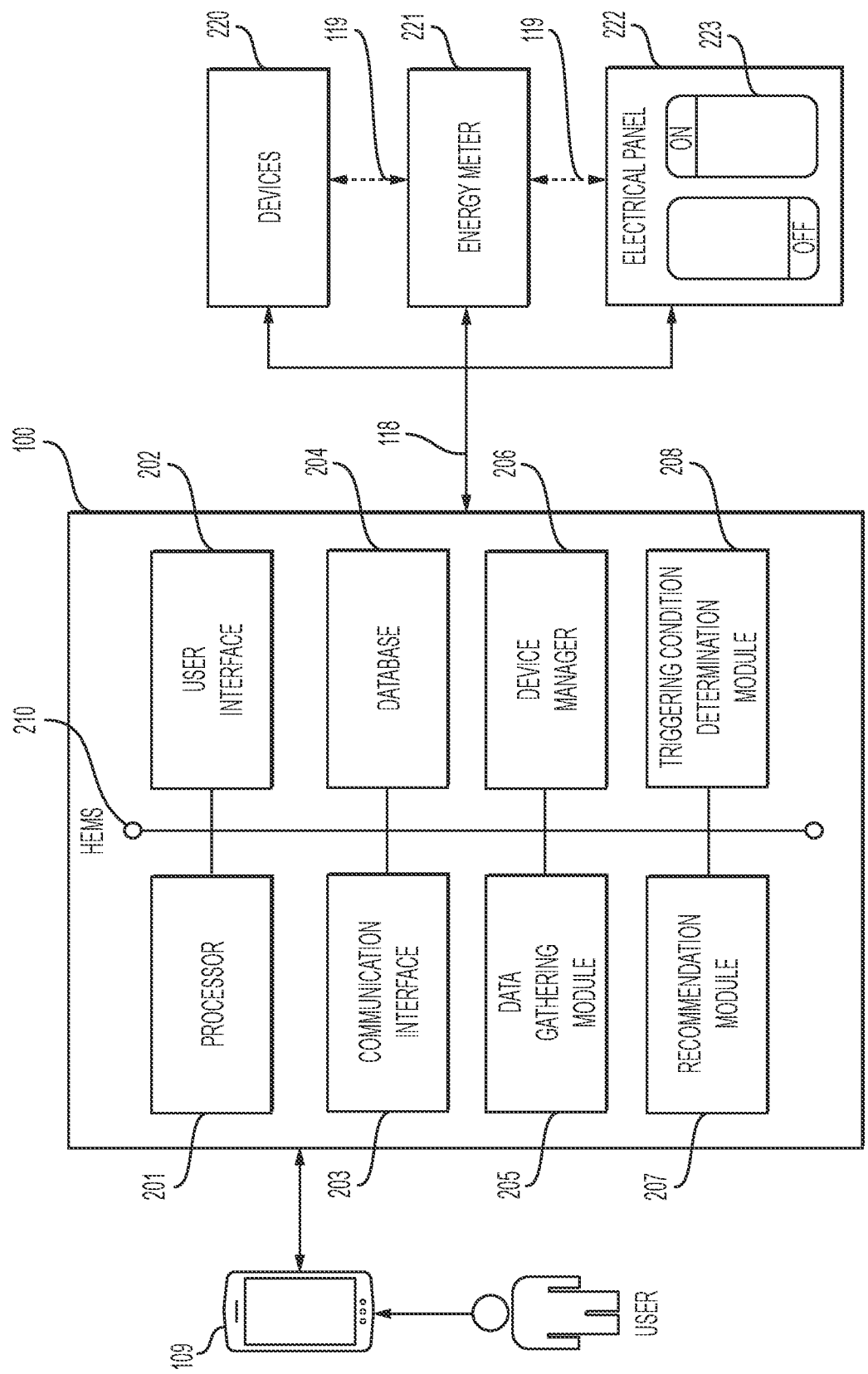
FIG. 2 illustrates an embodiment of a home energy management system.

FIG. 2 illustrates a schematic diagram of an embodiment of the home energy management system 100. In an example embodiment, the home energy management system 100 includes a communication pathway 210. The communication pathway 210 may be a physical bus, a logical bus or a combination of physical and logical buses. The home energy management system 100 may include a processor 201 that is in communication with at least a user interface 202, a communication interface 203, and a database 204 via the communication pathway 210. In some embodiments, the communication interface 203 may facilitate sending and receiving notifications to and from connected devices. For example, the communication interface 203 may enable the home energy management system 100 to exchange information with the user device, such as the computer system 109, for example, to enable the user device to function as a secondary user interface. In some example, the communication interface 203 allows users of the home energy management system 100 to provide user preferences and receive recommendations. In some embodiments, user interface 202 may interact with the one or more users of the network 118 via a connection with a wired or wireless telecommunication network available through communication interface 203. In one embodiment, the communication interface 203 may be a wireless transceiver that transmits and/or receives signals (e.g., commands, messages, information, etc.) to and/or from one or more devices 220 on the network 118.

According to some aspects, the home energy management system 100, using a data gathering module 205, receives the energy usage data, which can be the expected energy usage of devices in the home 101. The energy usage data can be obtained from energy usage or energy guide information of a device. Typically, printed energy usage data about a device is provided with the device or appliance. The energy usage data provides an estimate of expected energy consumption by this device over a one-year period. In one example, the computer system 109, such as a smart phone or tablet, may be used to log into the home energy management system 100 having the data gathering module 205, and the computer system 109 may capture the energy usage data of the device, for example, using a camera. The computer system 109 and/or the data gathering module 205 of the home energy management system 100 may use optical character recognition to capture the energy usage data printed or attached to the device. In another example, the computer system 109 and/or the data gathering module 205 of the home energy management system 100 may use a Near Field Communication (NFC) reader to capture the energy usage data stored by a NFC tag attached to the device. In yet another example, the energy usage data may be downloaded using a bar code, such as a matrix bar code, linking to the energy usage data. In at least one example, the device may be connected to a network 118 of the home 101 and may be electronically connected to the home energy management system 100, and the energy usage data may be communicated to the home energy management system 100 over the network. The energy usage data may be obtained from, for example, a governmental program (U.S. EPA Energy Star Program) or from a device manufacturer.

The home energy management system 100 may utilize the energy usage data to calculate an efficient use of energy among the connected devices. In at least one example, measured energy usage of one or more of the devices is recorded, for example, by the utility meter 117 or another energy meter (e.g., energy meter 221, FIG. 2). The measured energy usage recorded by a meter may be collected by the data gathering module 205 and stored in the database 204. The home energy management system 100, using a recommendation module 207, can receive the information from the user guides and/or a measured energy usage, and calculate an efficient use of energy given energy usage data and measured energy usage of the connected devices, and data about the power available to the home. The home energy management system 100, using the recommendation module 207, may calculate which devices to power and when to power them (e.g., a duty cycle).

The home energy management system 100, using a device manager 206, may control devices or power to circuits in the home to achieve a power consumption goal. In some examples, the device manager 206 may send commands to the devices 220 and/or an electrical panel 222 having one or more controllable breakers 223 to control a total load on the homes circuit 119. For example, the device manager 206 may limit a total load on a backup power system that is some percentage (e.g., 5%, 25%) below a continuous power supply of the backup power system. As power conditions change, for example, if an electric vehicle is connected to the circuit 119 to increase the available power supply of a battery backup system, the device manager 206 may adjust the devices 220 that are enabled to draw power from the circuit 119 and their duty cycles.

In cases of a power system or grid failure, or another anomaly detected by a triggering condition determination module 208 (e.g., at step 608 of FIG. 6) of the home energy management system 100, the home energy management system 100 may determine a subset of the devices that may be powered based on the capabilities of the backup energy supply. By dynamically reducing the number of devices drawing an electric current and/or reducing the load drawn by one or more devices, the home energy management system 100 may improve or optimize power usage in an environment in which energy is scarce or available at a premium.

In at least one aspect, the triggering condition determination module 208 of the home energy management system 100 may determine that a device has reached an end of its useful lifetime based on an efficiency calculation. For example, the triggering condition determination module 208 of the home energy management system 100 may determine (e.g., at step 505 of FIG. 5) that a device may be efficiently replaced based on a return-on-investment (ROI) calculation.

Figure 3:
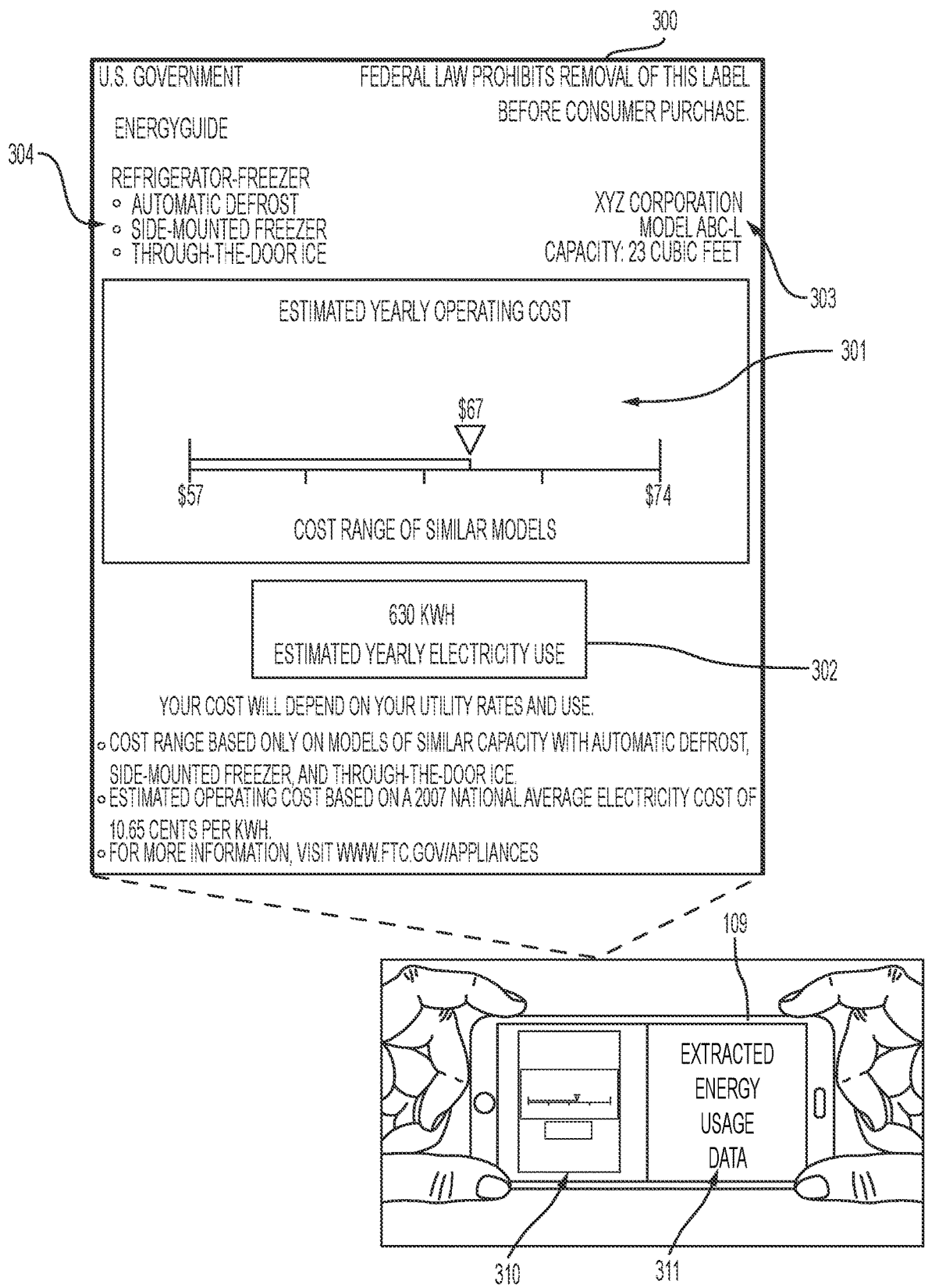
FIG. 3 illustrates an embodiment of energy guide information.

FIG. 3 illustrates an example of an energy guide information tag 300. This information may include an estimated yearly operating cost 301 of the device and the estimated yearly electricity user 302. The information may further include information about the device 303 such as the manufacturer, model, and capacities, and features of the device 304. According to some aspects, the information may be extracted from an image 310 of the energy guide information tag 300, for example, as extracted energy usage data 311. In some examples, the image 310 of the energy guide information tag 300 may be captured by the computer system 109.

Figure 4:
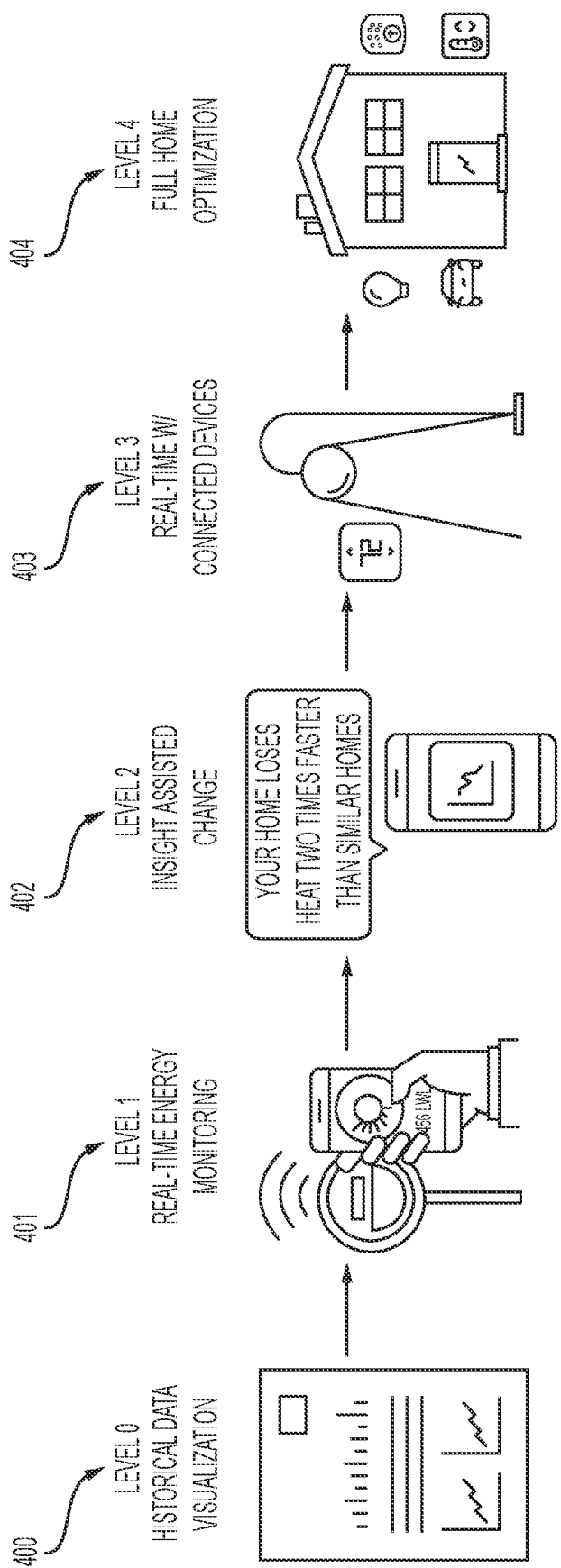
FIG. 4 illustrates levels of home energy management according to an embodiment.

FIG. 4 illustrates different example functional levels of the home energy management system 100 according to an embodiment. For example, a level 0 400 includes data visualization function, a level 1 401 includes energy monitoring, level 2 402 includes guided insights (e.g., Artificial Intelligent (AI) derived insights), level 3 403 includes communication and control of the devices, and level 4 404 includes an autonomous optimization engine combining the AI guided insights and the communication and control of the devices.

Figure 5:
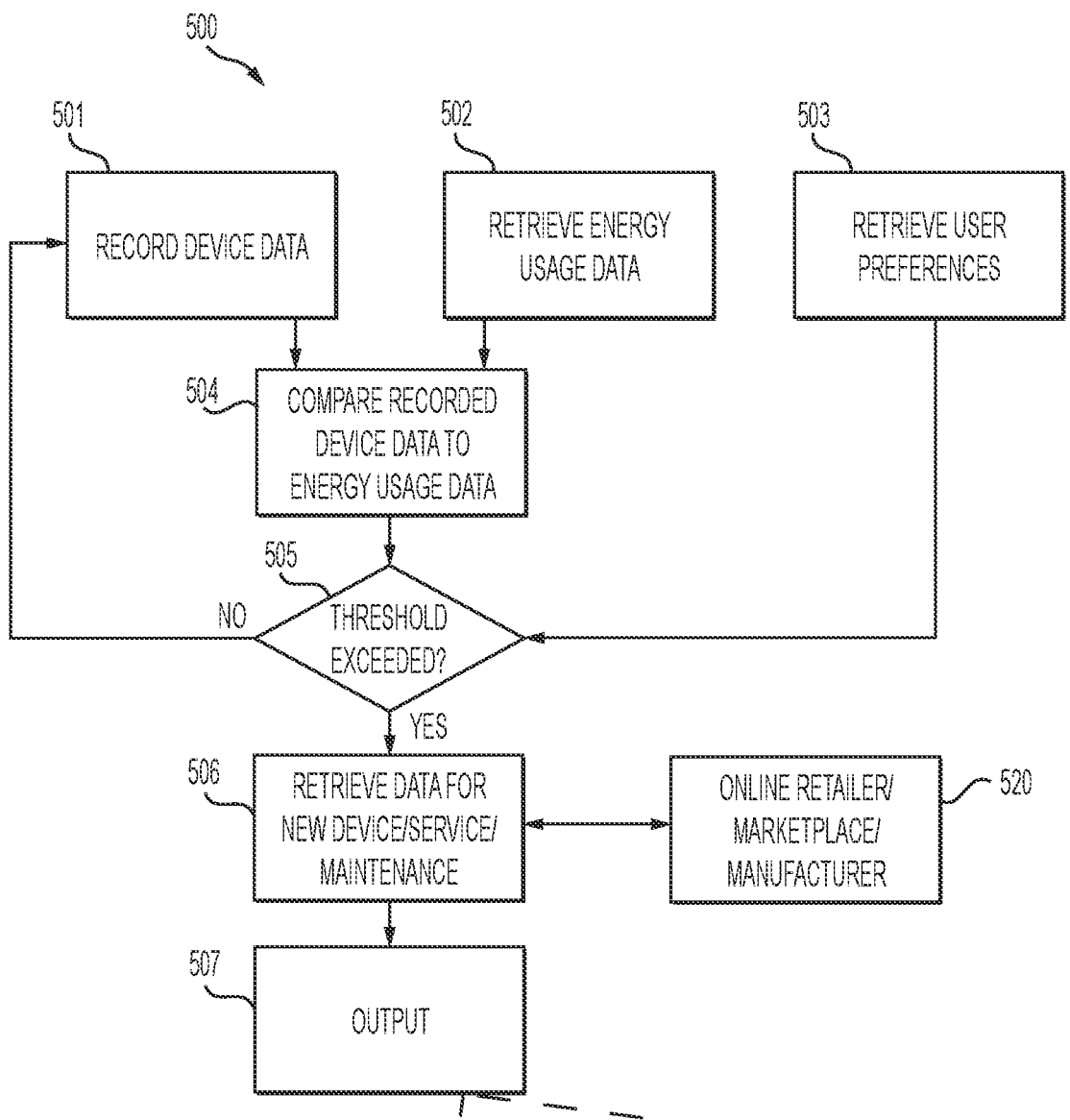
FIG. 5 illustrates an embodiment of a method of operating a home energy management system.
Figure 13:
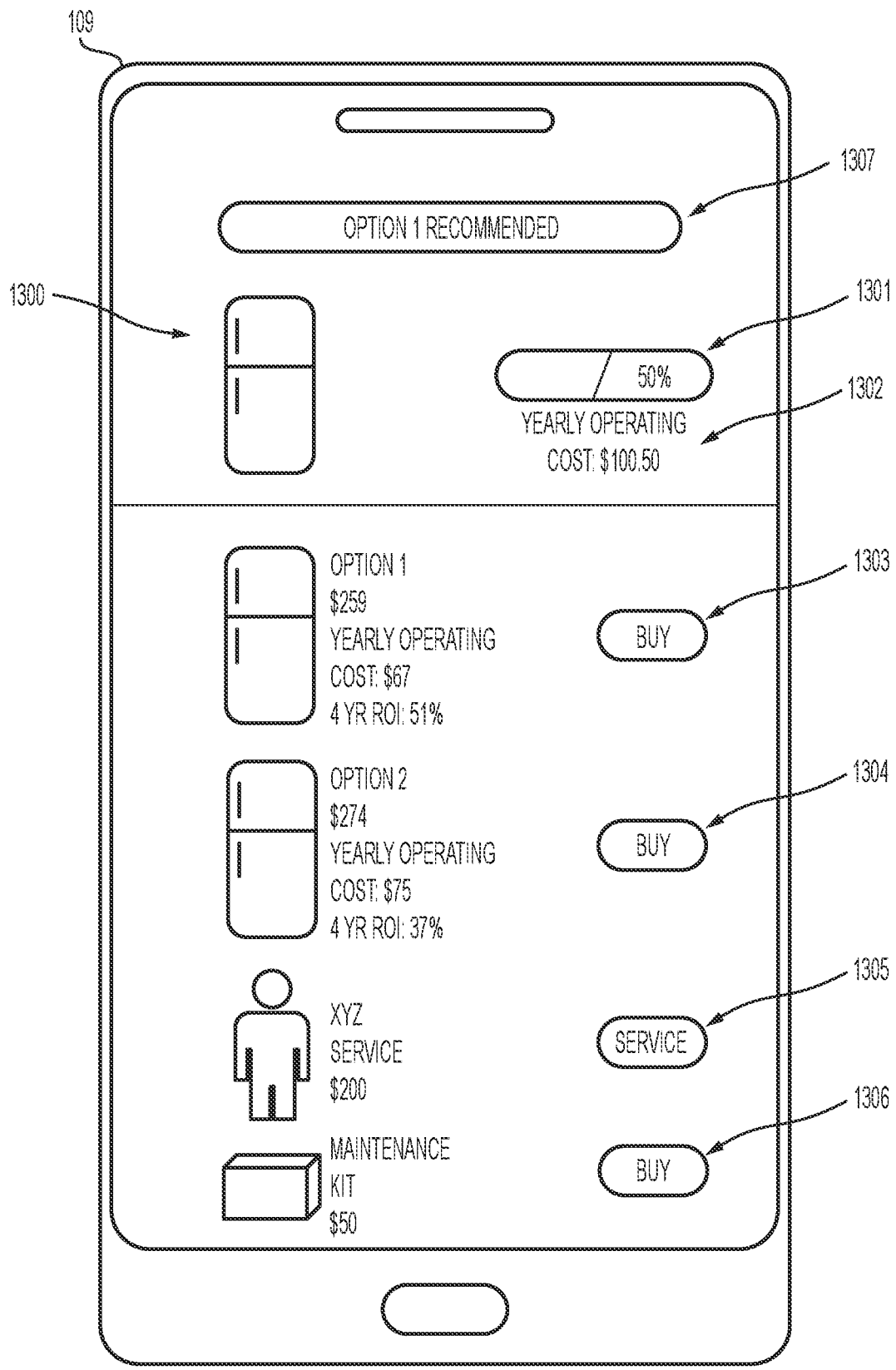
FIG. 13 illustrates an embodiment user interface of a home energy management system in an example device ecosystem.

FIG. 5 illustrates a method 500 of analyzing home device data. The method may include recording device data (step 501), retrieving energy usage data (step 502), and retrieving user preferences (step 503). The device data recorded at step 501 may include determining actual energy usage of the device as measured by the energy meter of the home energy management system, calculating the age of the device, and other parameters of the device. The energy usage data an the user preferences may be retrieved from the database of the home energy management system, for example, stored by the backend server 108. The method may include a comparison at step 504 of the recorded device data to the retrieved energy usage data. The comparison at step 504 may determine that the device is operating within published specifications. In a case where the retrieved energy usage data includes data for one or more replacement devices, the comparison may include a cost/benefit analysis of replacing a current device with a new, replacement device as illustrated in FIG. 13. The comparison may include a cost/benefit analysis of servicing the device. A result of the comparison at step 504 may be compared to a threshold value at step 505, where the threshold value may be specified in the user preferences. For example, the user preferences may indicate that a ROI greater than a threshold (e.g., 0.75 (75%), 1, 1.25) over a period of time (e.g., 6 months, 3 years, 5 years) generates a recommendation at step 507 to replace a given device. For example, as illustrated at 510, the system may output a recommendation 511 that a washing machine be replaced, services, or maintained. In a case where the threshold is exceeded at step 505, the data gathering module 205 of the home energy management system 100 may retrieve data about potential replacement devices at step 506. The output at step 507 may include a recommendation, determined by the recommendation module 207, to purchase a certain replacement device 512, or one of a number of potential replacement devices. In some cases the output at step 507 may include a recommendation to service the device. In yet another example, the output at step 507 may include an automatic purchase of a maintenance kit, for example, an air filter, to improve the performance of the device.

As illustrated in FIG. 13, the user interface of the home energy management system as displayed by the computer system 109 may display a recommendation 1307 related to a current device 1300. The user interface may indicate in a graphic 1301 that the device has lost 50% of its efficiency based on the device's published energy usage data for the device when it was new, and provides a current estimated yearly operating cost 1302. The determinations made by the home energy management system may be based on the measured power consumption of the current device. The home energy management system may retrieve replacement options from an online retailer, an online marketplace, or manufacturer 520 (see FIG. 5). The online retailer, marketplace or manufacturer may suggest popular replacement models for the current device and supply the energy usage data. In at least one example, the home energy management system searches an online database for different options and displays those devices with relatively high ROI.

The home energy management system may display the options, associated costs, energy usage data, and the ROI, together with a link to purchase the replacement option. For example, a first buy button 1303 may be associated with a first option and a second buy button 1304 may be associated with a second option. The ROI may be calculated using various equations. In the example, the 4 year ROI is calculated as the cost to run the current device, minus the cost to run the optional device, divided by the cost of the optional device. In some aspects, the home energy management system may retrieve and display information about a service of the current device, with a link 1305 to schedule the service, which may increase the efficiency of the current device and enable a user to delay a replacement of the current device. In one example, the home energy management system may retrieve and display information about a maintenance kit for servicing of the current device, with a link 1306 to buy the kit, which may increase the efficiency of the current device and enable a user to delay a replacement of the current device. In another example, the home energy management system may automatically place the order for the service or maintenance kit at step 507 (see FIG. 5) based on the user preferences.

Figure 6:
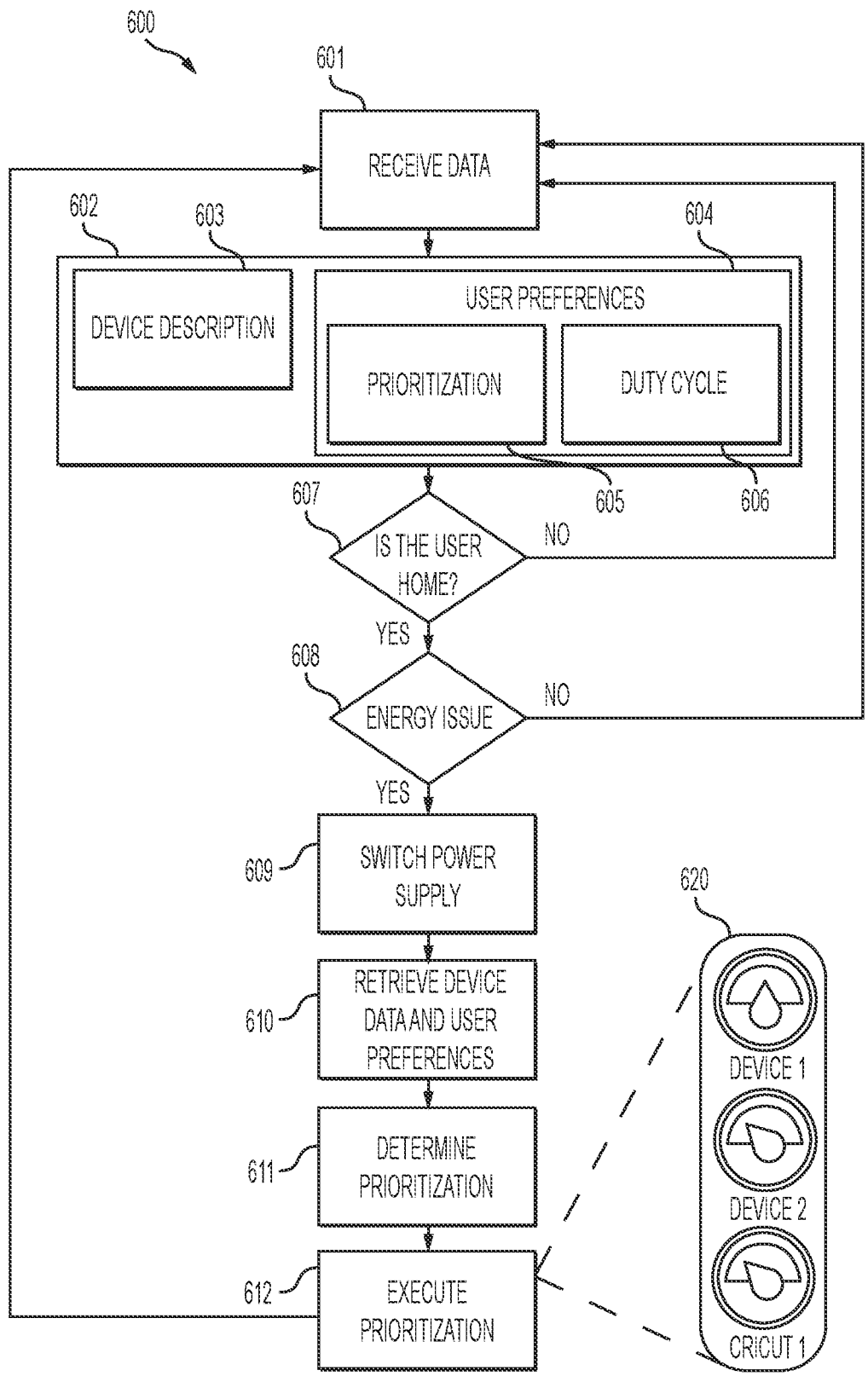
FIG. 6 illustrates an embodiment of a method of operating a home energy management system.

FIG. 6 illustrates an embodiment of a method 600 of operating a home energy management system. The method 600 may enable the home energy management system 100 to prioritized energy supply to certain devices, for example, in response to a power outage and/or in response to the resupply to power following the power outage. For example, the method 600 may include receiving data (step 601), storing data (step 602), determining whether a user is in a home (step 607), detecting whether there is currently an energy issue (step 608), retrieving device data and user preferences (step 610), determining prioritization information for controlling the devices (step 611), and executing a prioritization by controlling the devices power usage (step 612).

The acquisition of data at step 601 may include receiving data about a device from a user's smart phone, capturing data about the device, or communicating directly with the device. The data about the device may include the energy usage data. In one example, the home energy management system 100 may receive data from an electric vehicle or an electric vehicle charger including, for example, the date and time, a location of the electric vehicle, a current state of charge of the electric vehicle, a current charge level, whether the electric vehicle is currently plugged in, whether a connected electric vehicle is vehicle-to-grid (V2G) capable, and an expected time until the target state of charge is reached. Additional data may be communicated to the home energy management system 100 may include user preferences such as a target state of charge, a planned departure time of the electric vehicle, and a minimum state of charge. Further, data received at step 601 may include a current state of a power supplied by a utility and/or a state of charge of a backup power system, for example, as measured by the energy meter.

The storing of the data (step 602) may include, for example, storing a device description (step 603) and storing user preferences (step 604). The storing of the user preferences at step 604 may include storing prioritization information at step 605 and storing a duty cycle for the electric vehicle charger at step 606. It should be understood that a duty cycle may include data about a ratio of time a load or circuit is "ON" to the time the load or circuit is "OFF". The data may be stored on a local storage medium of the home energy management system 100, on the backend server 108, or elsewhere.

At step 607 the method performed by the home energy management system 100 may include determining whether a user is currently at home. For example, the home energy management system 100 may use a geofence feature for a user's smart phone (i.e., the computer system 109) having a global positioning capability to determine if the user is currently at home. In another example, a motion detector (e.g., one of the devices 220) in the home may be used to determine if the user is currently at home. If the user is away, the home energy management system 100 may continue to monitor the devices at step 601. One or more steps are contingent on the determination that the user is in the premises at step 607.

The method advances to step 608 if the user is home, which includes monitoring a state of a utility (e.g., power supply, internet access, water supply). For example, step 608 may include monitoring power arriving at the home from the gird using the energy meter 221. In some cases, the monitoring is performed using a current sensor of the energy meter 221, such as a clamp meter, at the electrical panel 222 or circuit-breaker box within the home. The energy meter 221 may monitor a main electric line arriving at the electrical panel 222 from the utility to detect disruptions of power from a utility and restoration of power from the utility. In some examples, the energy meter 221 may be installed at a street meter, where the energy meter 221 may communicate data to the home energy management system 100. The data may be communicated wirelessly or by an output port of the street meter.

At step 608, if no energy issue is detected (e.g., no change in a power status), the home energy management system 100 may continue to monitor the devices at step 601. In a case that an energy issue disrupting a power supply from the utility is detected at step 608, the home energy management system 100 may switch to the backup power supply at step 609 and retrieve the user preferences and device data at step 610 in order to control consumption of a backup power supply. In a case that an energy issue restoring a power supply from the utility is detected at step 608, the home energy management system 100 may switch to the utility supplied power at step 609 and retrieve the user preferences and device data at step 610 in order to activation of the devices. According to some aspects, a prioritized activation of the devices may protect devices connected to the electrical circuit from voltages drops that may be caused by multiple devices initiating a power draw simultaneously.

In the example of the electric vehicle, example device data and user preferences 700 are illustrated in FIG. 7 and may include, for example, the date and time, the location of the electric vehicle, the current state of charge of the electric vehicle, the current charge level, the expected time until the target state of charge is reached, the target state of charge, the planned departure time of the electric vehicle, and the minimum state of charge.

At step 611, the home energy management system 100 uses the retrieved device data and user preferences to make determinations about device prioritization. At step 611, the device data and the user preferences may include data about various devices associated with the home. For example, the device data and the user preferences 800 associated with the home are illustrated in FIG. 8 and may include individual devices or device categories 801, and for each of these, the energy consumption 802, a base duty cycle 803, one or more associated minimum duty cycles 804 and resulting durations 805, a priority ranking 806, and a confirmation status 807. As illustrated in FIG. 8, the home energy management system may store energy usage data, such as the energy consumption 802 internally in a database, which may enable decision making in the event of no network connectivity during power outage. Further, the database may include the user preferences 800 with priorities for different minimum duty cycles 804/resulting durations 805 for a same device. In the example, the refrigeration takes a higher priority as power becomes more constrained. For example, in a power constrained environment, for example, when the refrigeration may be run for 20 minutes and turned off for 80 minutes, the priority of the refrigeration is increased to priority 2

(assuming that a lower number indicates a higher priority) so that a minimum level of refrigeration may be ensured or protected.

At step 611 and in a case of the resumption of a power supply from a utility, the prioritization of the devices may set an order in which the devices are enabled to draw power from the electrical circuit. For example, devices with higher priorities as set by the user preference may be powered on before lower priority devices. Here, powering on may include turning on a smart device, restoring power to an electrical circuit via a controllable breaker, and more generally enabling the devices to draw a load from a power supply. In another example, the home energy management system may determine a wave of the devices to power on (before or after another wave of devices) based on the energy usage data of the devices, where for example, the The prioritization at step 612 may result in power being apportioned between devices and/or circuits of the home as illustrated in the user interface 620 of the home energy management system. For example, a first device (e.g., Device 1) having a high priority may be powered normally, while a second device (e.g., Device 2) and a first circuit having low priorities have power turned off or run at reduced duty cycles. In some cases, the control of the power flowing to devices and/or circuits is controlled by a smart electrical panel 1201 (see FIG. 12). In at least one case, the devices and/or circuits (e.g., circuit breakers) are smart devices that may be controlled by commands received from the home energy management system. For example, Device 2 may be controlled by the home energy management system to be turned off until utility supplied power is restored to the home and a backup system can be returned to a stand-by condition. The state of different power supplies (e.g., street power received from an electric utility, battery backup) may be determined by an energy meter of the home energy management system.

Figure 14:
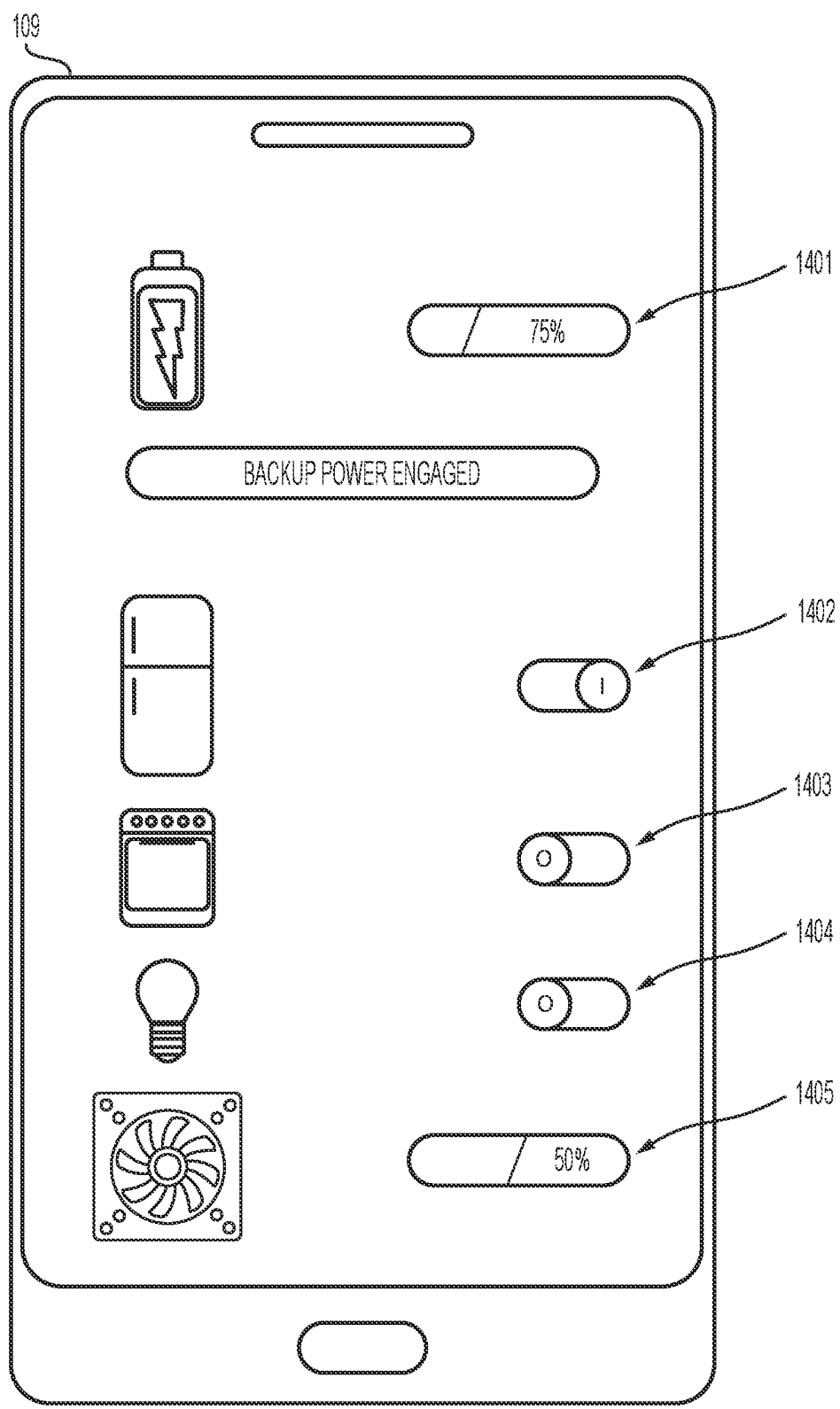
FIG. 14 illustrates an embodiment user interface of a home energy management system in an example device ecosystem.

In an example case where a primary power supply or street supplied power supply fails, a backup power supply may be engaged (for example, automatically upon detecting a voltage drop). As illustrated in FIG. 14, the user interface of the home energy management system as displayed by the computer system 109 may indicate that a backup power supply has been engaged and a state of the back up power supply (as indicated by a first graphic 1401). The backup power supply may be, for example, an electric vehicle, a home energy storage product, or a gas powered backup generator. The home energy management system, referencing the user preferences and device prioritization data, may determine, at step 612, to continue to power a refrigerator (as indicated by a first slider 1402) and to turn off an electric over (as indicated by a second slider 1403) and one or more lights (as indicated by a third slider 1404). In addition, the home energy management system, referencing the user preferences and device prioritization data, may determine, at step 612, to run a whole house fan at 50% power (as indicated by a second graphic 1405). In some cases, a decision to power a device, or not, may be based on an energy cost associated with the device and the energy usage data. The prioritization at step 612 may enable the home energy management system to power a group of high priority devices in the home while conserving energy, for example, to avoid an overload of the backup power. The user interface may enable a user to override the prioritization decisions made by the home energy management system, for example, by clicking a displayed slider, e.g., first slider 1402.

In another example, the cost to run each device may be used by the home energy management system to calculate and implement a power distribution among the apparatuses at steps 611-612. In this example, the home energy management system may avoid powering one or more devices during high cost/high demand periods of time, and reduce an overall cost to run the devices of the home.

Referring generally to FIG. 7 and FIG. 8, according to some aspects, the home energy management system may monitor consumption of devices and compare the consumption to an expectation, where the expectation is based on the energy usage data The comparison may be used in, for example, determining a point where replacing the device is beneficial. In one example, a beneficial replacement may be determined where a predicted cost to run the device over a time period exceeds a replacement cost. The time period may be, for example, 3 months, 6 months or 1 year. The comparison may take into account an improved efficiency of a new device determined based on published energy usage data.

Figure 9:
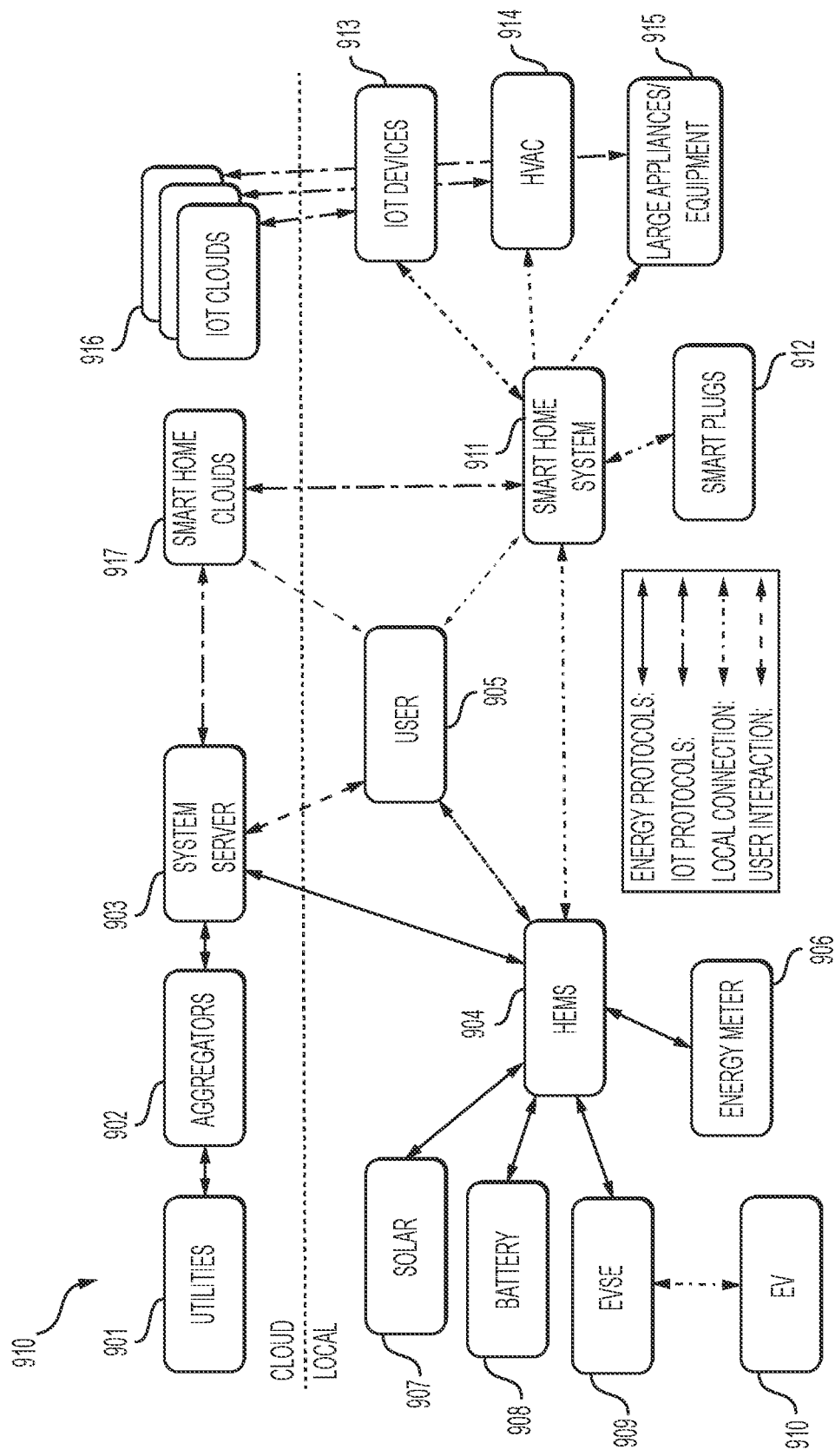
FIG. 9 illustrates an embodiment of a home energy management system in an example device ecosystem.

FIG. 9 illustrates an embodiment of a home energy management system in an example device ecosystem 900. The example device ecosystem 900 may be, for example, a Connected Home over IP (CHIP) ecosystem with communication enabled across platforms. The example device ecosystem 900 includes devices and services in a cloud environment and in a local environment. The cloud environment may include utilities 901 and their servers, data aggregators 902, and a system server 903. The system server 903 may communicate directly with the home energy management system 904 and a user device 905. The user device 905 may be, for example, a smart phone or tablet. The home energy management system 904 is connected to the devices in the home, or local environment. These devices may include an energy meter 906, solar power components 907, battery backup components 908, an electric vehicle supply equipment 909 (EVSE) and an electric vehicle 910. These connections may be wired or wireless.

The system server 903 and the home energy management system 904 enable connections to a smart home system 911 and/or a smart home cloud 917. The smart home system 911 and/or the smart home cloud 917 may be used to interface with and control smart devices, such as a smart plug 912. Within the local environment, the smart home system 911 may include additional connections, for example, to IoT devices 913, an HVAC system 914, and high load devices 915. The high load devices 915 may include appliances and equipment such as electric ovens, pool pumps, and refrigerators. In some aspects, the IoT devices 913 may connect to an IoT cloud 916.

In FIG. 9, communications may be by one or more protocols. For example, these protocols may include energy protocols, IoT protocols, local connections, and user interactions. Communications may be by wireless or wired connections. One device, such as the user device 905 may support communications with one or more protocol.

Figure 10:
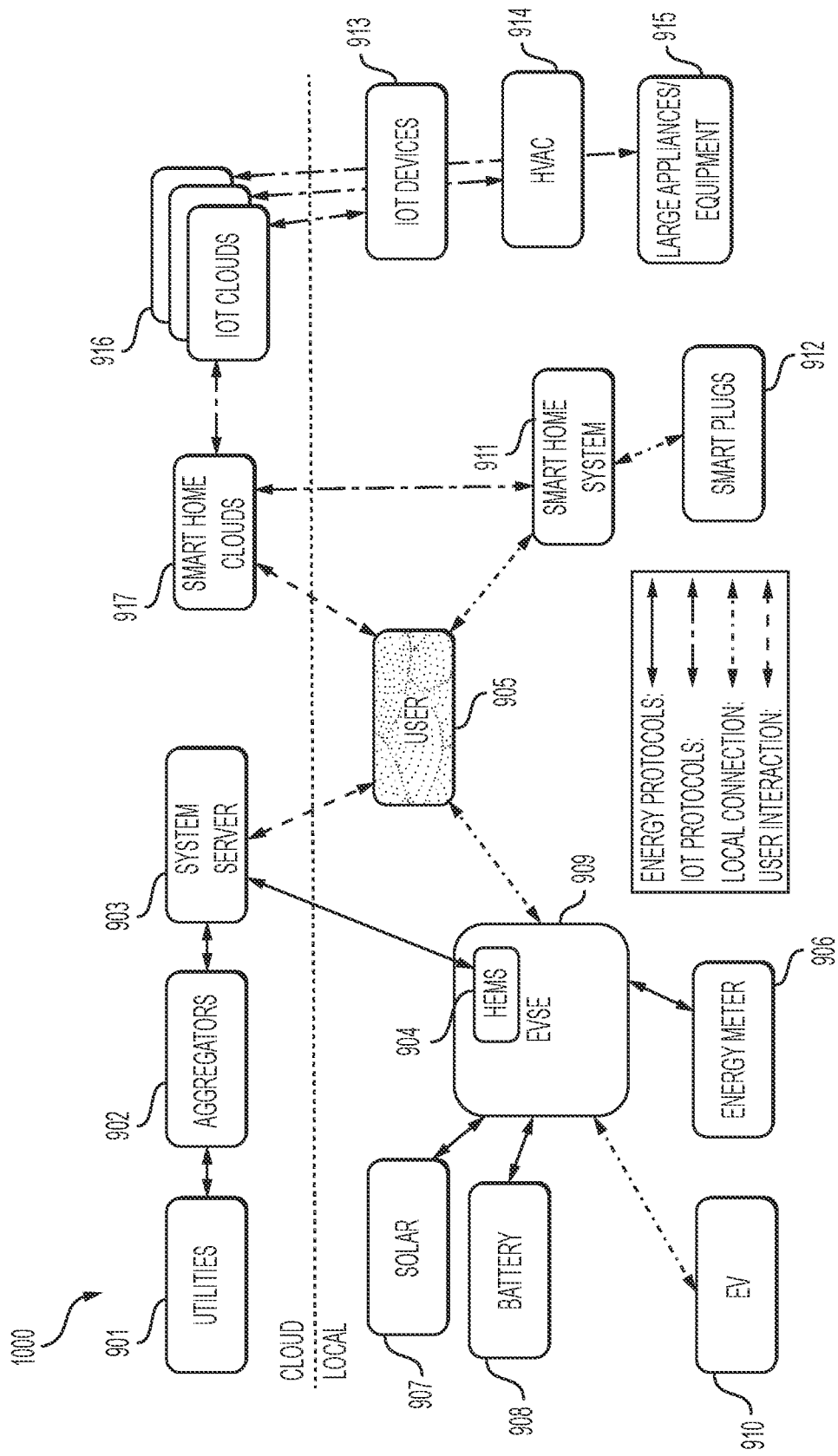
FIG. 10 illustrates an embodiment of a home energy management system in an example device ecosystem.

FIG. 10 illustrates an embodiment of a home energy management system in a first device ecosystem 1000. In some aspects, the user device 905 may communicate with the system server 903, the electric vehicle supply equipment 909, the smart home system 911 and the smart home cloud 917. In some embodiments, the home energy management system 904 is a component of the electric vehicle supply equipment 909. The electric vehicle supply equipment 909 may interface with the energy meter 906, the solar power components 907, the battery backup components 908, and the electric vehicle 910. The first device ecosystem 1000 enables control of the electric vehicle supply equipment 909 and smart home system 911 by the user device 905. Control of the IoT devices 913, the HVAC system 914, and the high load devices 915 is enabled through the smart home cloud 917 and the IoT cloud 916.

In the case of a power outage, the home energy management system 904 may supply energy to devices in the home using energy stored in an electric vehicle or other home battery backup. The home energy management system 904 may decide which devices to power during the power outage based on a current state of charge of the home battery backup and an expected energy load on the home battery backup of those devices.

Figure 11:
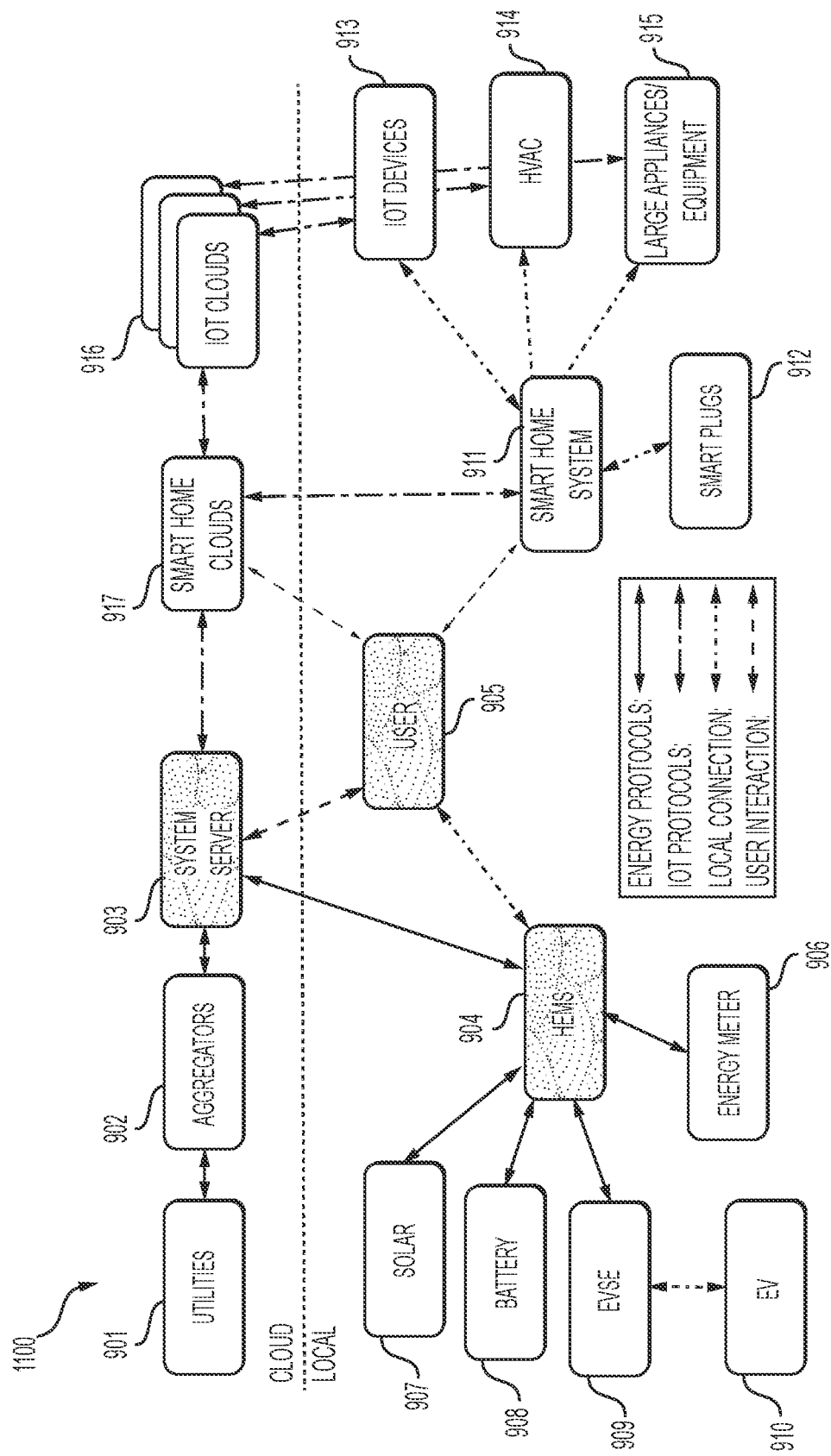
FIG. 11 illustrates an embodiment of a home energy management system in an example device ecosystem.

FIG. 11 illustrates an embodiment of a home energy management system in a second device ecosystem 1100. In some aspects, the user device 905 may communicate with the system server 903, the home energy management system 904, the smart home system 911 and the smart home cloud 917. In some embodiments, the home energy management system 904 enables the user device 905 to communicate with the energy meter 906, the solar power components 907, the battery backup components 908 and the electric vehicle supply equipment 909. In some cases, the electric vehicle supply equipment 909 enables communication with the electric vehicle 910. The second device ecosystem 1100 enables communication between the system server 903 and the smart home cloud 917. Similar to the first device ecosystem 1000, control of the IoT devices 913, the HVAC system 914, and the high load devices 915 is enabled through the smart home cloud 917 and the IoT cloud 916.

In some examples, the system server 903, the home energy management system 904 and the user device 905 receive data and to control different connected devices, for example, to control power supplied to the devices and duty cycles. Other aspects of the devices may be controlled.

Figure 12:
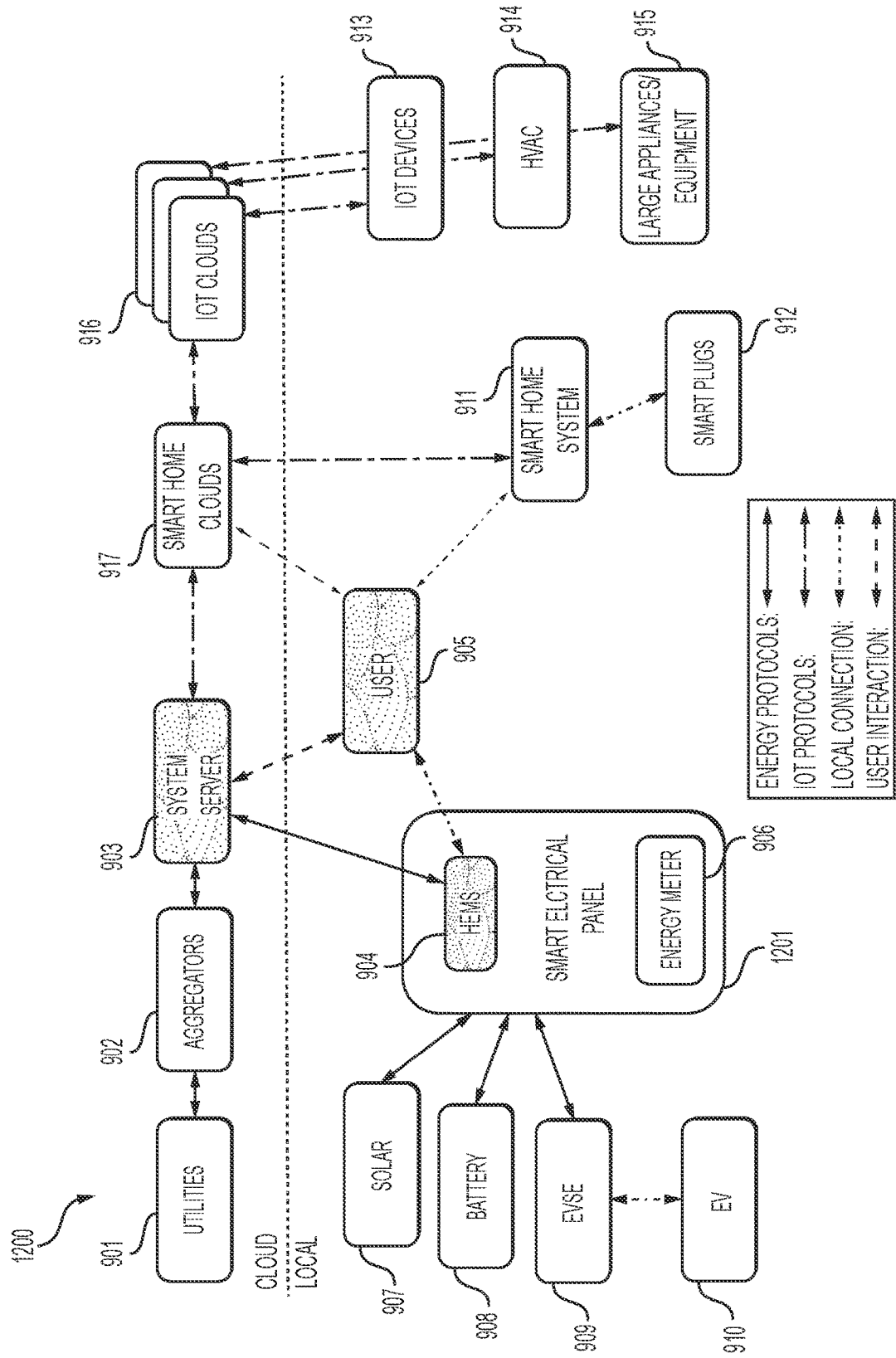
FIG. 12 illustrates an embodiment of a home energy management system in an example device ecosystem.

FIG. 12 illustrates an embodiment of a home energy management system in an example device ecosystem 1200. In some aspects, the user device 905 may communicate with a smart electrical panel 1201. The smart electrical panel 1201 may include the home energy management system 904 and the energy meter 906, the smart home system 911 and the smart home cloud 917. In some embodiments, the home energy management system 904 enables the user device 905 to communicate with the energy meter 906, the solar power components 907, the battery backup components 908 and the electric vehicle supply equipment 909. In some cases, the electric vehicle supply equipment 909 enables communication with the electric vehicle 910. The second device ecosystem 1100 enables communication between the system server 903 and the smart home cloud 917. Similar to the first device ecosystem 1000, control of the IoT devices 913, the HVAC system 914, and the high load devices 915 is enabled through the smart home cloud 917 and the IoT cloud 916.

In some examples, the system server 903, the home energy management system 904 within the smart electrical panel 1201, and the user device 905 receive data and to control different connected devices, for example, to control power supplied to the devices and duty cycles. Other aspects of the devices may be controlled. According to some aspects, an improved metering infrastructure includes the home energy management system 904 and the energy meter 906 within the smart electrical panel 1201, which enables metering at the panel, in addition to fast and efficient reactions to changing power conditions and control of the devices. For example, the home energy management system 904 may calculate a current cost of a device based on historic power consumption of the device, and a cost benefit analysis of using the device. The cost benefit analysis may include costs of operating the device with different prioritizations (i.e., user preference values), a cost to replace the device, and an expected savings that may be realized by replacing the device with a new more efficient device. In another example, the home energy management system may store energy guides internally in a database to aid the home energy management system 904 in decision making in a case that no network connectivity is available during power outage.

According to some aspects, the home energy management system 904 may visually/graphically display data about the system, such as a cost benefit of changing to more energy efficient devices, which may include appliances, heaters, and air conditioning. In another example, the home energy management system 904 may store an age of a device, such as an installed date of the device in a home and/or an average lifespan of the device, and trigger an output embodying a recommendation to replace the device upon reaching a certain age. The home energy management system 904 may output information, such as the recommendation, to the user device 905, causing the user device 905 to display up to date information and alerts.

The embodiments of the disclosure may be systems, methods, and/or computer program products. The computer program products may include a computer-readable storage medium, in which a computer-readable program instruction configured to enable a processor to implement each aspect of the disclosure is carried.

The computer-readable storage medium may be a physical device capable of retaining and storing an instruction used by an instruction execution device. For example, the computer-readable storage medium may be, but not limited to, an electric storage device, a magnetic storage device, an optical storage device, an electromagnetic storage device, a semiconductor storage device, or any appropriate combination thereof. More specific examples (non-exhaustive list) of the computer-readable storage medium include a portable computer disk, a hard disk, a RAM, a ROM, an EPROM (or a flash memory), an SRAM, a Compact Disc Read-Only Memory (CD-ROM), a Digital Video Disk (DVD), a memory stick, a floppy disk, a mechanical encoding device, for example, a punched card or in-slot raised structure with an instruction stored therein, and any appropriate combination thereof. Herein, the computer-readable storage medium is not explained as a transient signal, for example, a radio wave or another freely propagated electromagnetic wave, an electromagnetic wave propagated through a wave guide or another transmission medium (for example, a light pulse propagated through an optical fiber cable) or an electric signal transmitted through an electric wire.

The computer-readable program instruction described here may be downloaded from the computer-readable storage medium to each computing/processing device or downloaded to an external computer or an external storage device through a network such as the Internet, a Local Area Network (LAN), a Wide Area Network (WAN) and/or a wireless network. The network may include a copper transmission cable, optical fiber transmission, wireless transmission, a router, a firewall, a switch, a gateway computer and/or an edge server. A network adapter or network interface in each computing/processing device receives the computer-readable program instruction from the network and forwards the computer-readable program instruction for storage in the computer-readable storage medium in each computing/processing device.

The computer program instruction configured to execute the operations of the disclosure may be an assembly instruction, an Instruction Set Architecture (ISA) instruction, a machine instruction, a machine related instruction, a microcode, a firmware instruction, state setting data or a source code or target code edited by one or any combination of more programming languages, the programming language including an object-oriented programming language such as Smalltalk and C++ and a conventional procedural programming language such as "C" language or a similar programming language. The computer-readable program instruction may be completely executed in a computer of a user or partially executed in the computer of the user, executed as an independent software package, executed partially in the computer of the user and partially in a remote computer, or executed completely in the remote server or a server. Under the condition that the remote computer is involved, the remote computer may be connected to the computer of the user through any type of network including an LAN or a WAN, or may be connected to an external computer (for example, connected by an Internet service provider through the Internet). In some embodiments, an electronic circuit such as a programmable logic circuit, an FPGA, or a Programmable Logic Array (PLA) may be customized by use of state personal information of a computer-readable program instruction, and the electronic circuit may execute the computer-readable program instruction, thereby implementing each aspect of the disclosure.

Herein, each aspect of the disclosure is described with reference to flowcharts and/or block diagrams of the method, device (system) and computer program product according to the embodiments of the disclosure. It is to be understood that each block in the flowcharts and/or the block diagrams and a combination of various blocks in the flowcharts and/or the block diagrams may be implemented by computer-readable program instructions.

These computer-readable program instructions may be provided for a universal computer, a dedicated computer or a processor of another programmable data processing device, thereby generating a machine to further generate a device that realizes a function/action specified in one or more blocks in the flowcharts and/or the block diagrams when the instructions are executed through the computer or the processor of the other programmable data processing device. These computer-readable program instructions may also be stored in a computer-readable storage medium, and through these instructions, the computer, the programmable data processing device and/or another device may work in a specific manner, so that the computer-readable medium including the instructions includes a product including instructions for implementing various aspects of the function/action specified in one or more blocks in the flowcharts and/or the block diagrams.

These computer program instructions can also be loaded to a computer, another programmable data processing device or other devices, so that a series of operating steps are performed on the computer, the another programmable data processing device or other devices to produce a computer-implemented process, and therefore instructions executed on the computer, the another programmable data processing device or other devices may implement the function/action specified in one or more blocks in the flowcharts and/or the block diagrams.

The flowcharts and block diagrams in the drawings illustrate example system architectures, functions and operations of the system, method, and computer program product according to multiple embodiments of the disclosure. Each block in the flowcharts or the block diagrams may represent part of a module, a program segment or an instruction, and part of the module, the program segment or the instruction includes one or more executable instructions configured to realize a specified logical function. In some implementations, the functions marked in the blocks may also be realized in a sequence different from those marked in the drawings. For example, two sequential blocks may actually be executed substantially concurrently and may also be executed in a reverse sequence. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A method of operating an energy management system comprising:
utilizing a device processor to execute instructions stored on a non-transitory computer readable medium for performing the following steps:
obtaining first energy usage data regarding expected energy usage of a first device;
storing the first energy usage data in a database of the energy management system;
storing a user selected preference in the database;
recording a measured energy usage data of the first device;
determining a difference between the first energy usage data and the measured energy usage data;
determining that the difference exceeds a threshold specified by the user selected preference;
retrieving second energy usage data regarding expected energy usage of a second device; and
displaying a recommendation for replacing the first device with including the second device.

2. The method of claim 1, further comprising:
displaying a first operating cost of the first device; and
displaying a second operating cost of the second device.

3. The method of claim 1, wherein obtaining the first energy usage data comprises:
receiving an image from a computer system; and
extracting the first energy usage data from the image.

4. The method of claim 1, further comprising displaying a button configured to facilitate a purchase of the second device.

5. The method of claim 1, wherein the step of recording the measured energy usage data of the first device comprises measuring the measured energy usage data by an electric meter.

6. The method of claim 1, further comprising communicating the recommendation to a user device, wherein the step of displaying the recommendation is performed by the user device.

7. A method of operating an energy management system comprising:

utilizing a device processor to execute instructions stored on a non-transitory computer readable medium for performing the following steps:

obtaining first energy usage data regarding expected energy usage of a first device;

storing the first energy usage data in a database of the energy management system;

storing a user selected preference in the database;

recording a measured energy usage data of the first device;

determining a difference between the first energy usage data and the measured energy usage data;

determining that the difference exceeds a threshold specified by the user selected preference;

determining a recommended response upon determining that the difference exceeds the threshold specified by the user selected preference; and displaying the recommended response.

8. The method of claim 7, wherein the recommendation is one of replacement with a second device, service of the first device, and maintenance of the first device.

9. The method of claim 8, further comprising displaying a button configured to facilitate a purchase of the recommended second device.

10. The method of claim 8, further comprising displaying a button configured to facilitate a purchase of the recommended service.

11. The method of claim 8, further comprising displaying a button configured to facilitate a purchase of a maintenance kit associated with the recommended maintenance.

12. The method of claim 8, further comprising:
displaying a first operating cost of the first device; and
displaying a second operating cost of the second device.

13. The method of claim 7, wherein obtaining the first energy usage data comprises:
receiving an image from a computer system; and
extracting the first energy usage data from the image.

14. The method of claim 7, wherein the step of recording the measured energy usage data of the first device comprises measuring the measured energy usage data by an electric meter.

15. The method of claim 7, further comprising communicating the recommendation to a user device, wherein the step of displaying the recommended response is performed by the user device.

* * * * *